(12) United States Patent
Kothari et al.

(10) Patent No.: US 7,869,585 B2
(45) Date of Patent: Jan. 11, 2011

(54) DECLARATIONS FOR TRANSFORMATIONS WITHIN SERVICE SEQUENCES

(75) Inventors: Nikhil Kothari, Sammamish, WA (US); Hsiang-Hao Kung, Kirkland, WA (US); Stefan N. Schackow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1335 days.

(21) Appl. No.: 11/378,711

(22) Filed: Mar. 17, 2006

(65) Prior Publication Data

US 2007/0220177 A1    Sep. 20, 2007

(51) Int. Cl.
*H04M 3/00* (2006.01)
*H04M 5/00* (2006.01)
*H04M 3/42* (2006.01)

(52) U.S. Cl. ............. 379/243; 379/201.01; 379/201.02; 379/201.05; 379/207.02; 379/242

(58) Field of Classification Search ............ 379/266.07, 379/243, 201.01, 201.02, 201.05, 207.02, 379/242; 717/114
See application file for complete search history.

(56) References Cited

U.S. PATENT DOCUMENTS 6,941,511 B1   9/2005  Hind et al.

| | | |
|---|---|---|
| 2004/0111533 A1 | 6/2004 | Beisiegel et al. |
| 2004/0133635 A1 | 7/2004 | Spriestersbach et al. |
| 2004/0267760 A1 | 12/2004 | Brundage et al. |
| 2006/0041861 A1* | 2/2006 | Trefler et al. ............... 717/114 |

FOREIGN PATENT DOCUMENTS

WO       WO 01/95155        12/2001

OTHER PUBLICATIONS

Supporting Dynamic Interactions Among Web-Based Information Sources; Athman Bouguettaya, Boualem Bentallah, Lily Hendra, Mourad Ouzzani & James Beard; IEEE Transaction on Knowledge and Data Engineering, vol. 12, No. 5, Sep./Oct. 2000, p. 779-801.
Product Development Process Capture and Display Using Web-Based Technologies; Nader Sabbghian, Prof. Steven Eppinger, Prof. Earll Murman, 1998 IEEE, p. 2664-2669.
InfoHarness: Managing Distributed, Heterogeneous Information; Kshitu Shah & Amit Sheth; Nov./Dec. 1999.

* cited by examiner

*Primary Examiner*—Thjuan K Addy
(74) *Attorney, Agent, or Firm*—Workman Nydegger

(57) ABSTRACT

A declarative model for specifying appropriate transformations that may occur at the input and output of each service of a sequence of services that accomplish a more complex task. Each of the services may have access to the appropriate transformation declarations, and may interpret the declarations to thereby be appropriate directed on transforms to occur in its input data and/or output data. In order to change a transformation, the transformation declaration may be altered.

18 Claims, 4 Drawing Sheets

DECLARATIONS FOR TRANSFORMATIONS WITHIN SERVICE SEQUENCES

BACKGROUND

Computing technology has contributed enormously to the advancement of humankind. Computing systems come in a wide variety of physical forms including desktop computers, laptop computers, personal digital assistants, telephones, and even devices that have not been conventionally thought of as computing systems such as, for example, refrigerators and automobiles. Thus, a computing system may be any device or system that has a processor and a memory of any type. Computing systems may even have constituent computing systems that collaborate together as in network systems. Accordingly, some computing systems may fit easily into the palm of the hand, while others may be distributed globally.

Many of the most commonly used applications rely on network technologies. Such applications include, for example, e-mail, instant messaging, web browsing, remote network access, electronic whiteboarding, voice-over-IP telephone communication, video conferencing, remote synchronization, and many others. Currently, there are many services that are offered over the Internet. The variety of such services are enumerable and are increasing daily. For example, there are search engine services, company locator services, stock quote services, e-mail services, remotes computer access services, on-line auction services, amongst many others.

Sometimes, the performance of a more complex task involves the services of multiple services in sequence. The output from one of the services is provided to the input of another service and so forth until the final result is achieved. The user input is provided to the first service recognizing that the user may be a human being or may be a computing system and/or one or more processes running on a computing system. That user input may need to be transformed into a format that is recognized by the first service. The final service provides the resulting data in a format that may need to be transformed prior to being presented to the end user. Furthermore, as one service communicates with the next service in the sequence, transformations may be needed in order to properly transform the data between services as well. Thus, various transformations may be made on input and output data in order to allow the services to communicate with the user and with each other.

Typically, the transformations are made using specific dedicated code for each of the transformations. Thus, code would be used to transform the user data into an appropriate format for input to the first service, code would be used between each of the services to perform appropriate transformations, and code would be used to transform the resultant data from the final service into a format understood by the user. The drafting of such code may be a time-consuming activity and require the skills of experienced software programmers.

BRIEF SUMMARY

Although not required, embodiments of the present invention may be applied in an environment in which there is a sequence of two or more services that are executed in series in order to fulfill a complex services request. In order to accomplish appropriate transformations at the input and output of each of these services, the transformations may be specified declaratively by using a transformation class field specifying a class of transformation to be performed, as well as transformation parameter field(s) that more specifically define the transformation. The transformation declarations may be made available at each of the services, thereby giving appropriate direction in making the transformations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION

Embodiment of the present invention extend to a declarative model for specifying appropriate transformations that may occur at the input and output of each service of a sequence of services that accomplish a more complex task. Each of the services may have access to the appropriate transformation declarations, and may interpret the declarations to thereby be appropriate directed on transforms to occur in its input data and/or output data. In order to change a transformation, the transformation declaration may be altered, rather than altering the underlying code that accomplishes each transformation.

Figure 1:
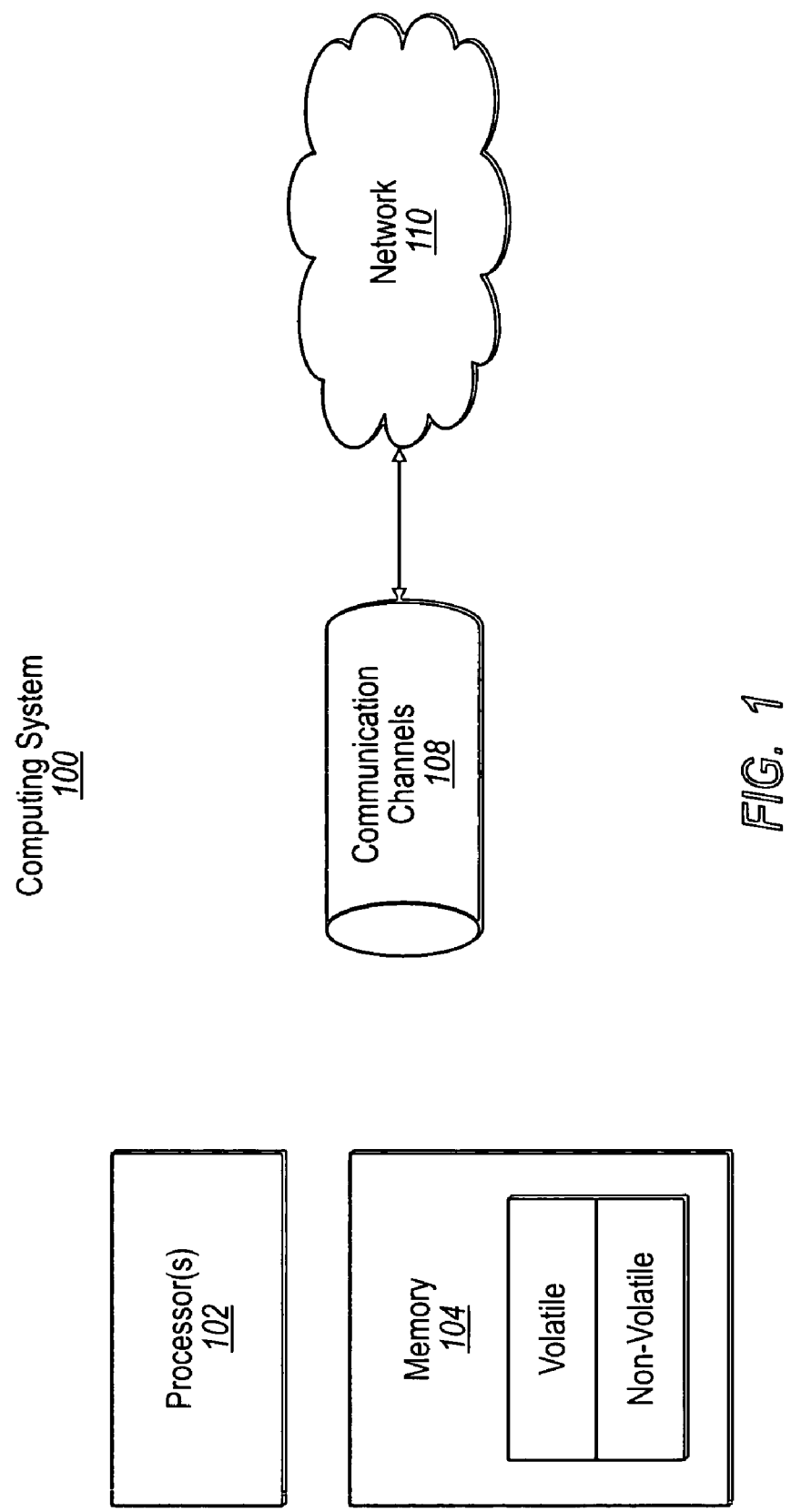
FIG. 1 illustrates a computing system in which embodiments of the principles of the present invention may operate.

The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. Computer-readable media may be divided into two separate categories: computer storage media, and communication media. Computer storage media comprises RAM, ROM, EEPROM, CD-ROM or other optical disk storage, magnetic disk storage or other magnetic storage devices, or any other similar medium which can be used to store desired program code means in the form of computer-executable instructions or data structures which can be accessed by a general purpose or special purpose computer. However, computer storage media does not include signals. Communication media comprises signals and the media used to propagate signals. For example, when information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
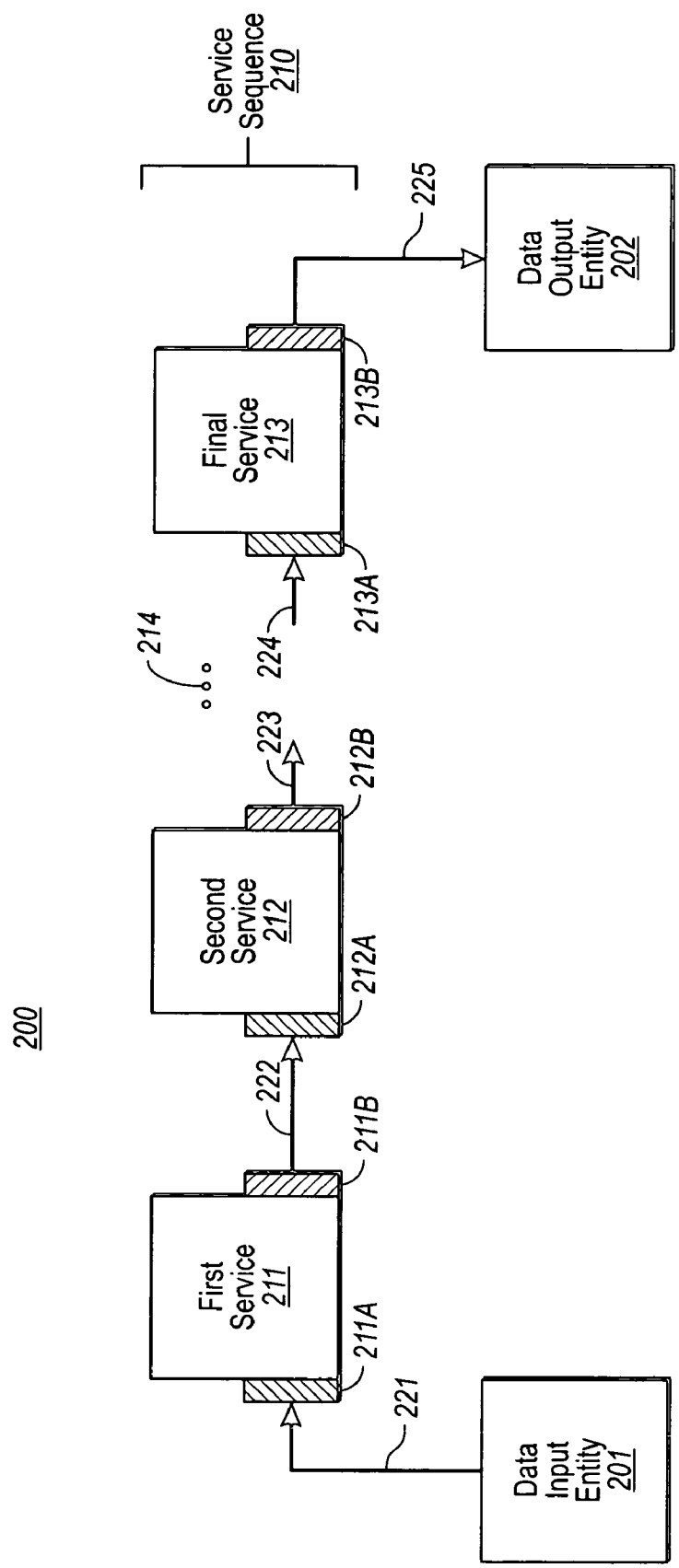
FIG. 2 illustrates an environment including a sequence of services in which embodiments of the present invention may operate.

FIG. 2 illustrates an environment 200 in which the principles of the present invention may be employed. The environment 200 includes a sequence of services 210 including for, instance, the first service 211, the second service 212 and the final service 213 in the sequence. However, there may be additional services as represented by the horizontal ellipses 214 placed between the second and final services 212 and 213. Furthermore, there may be only two services in the sequence, in which case, the second service 212 may be the same as the final service 213 in the sequence 210. The environment 200 also includes a data input entity 201 that provides input data to the sequences of services 210, and a data output entity 202 that consumes resulting output data from the sequence of services 210.

The sequence of services may be performed in series in order to permit a complex task to be achieved. For instance, suppose that a complex task is to gain stock quotes for all corporations within a given geographical region. This might be accomplished by using a first service in the form of a map service that responds to latitude and longitude coordinate ranges by returning a list of corporations within that specified area. A second service in the form of a finance service then obtains a stock quote for all of the listed corporations returned by the first service. This scenario will be referred to hereinafter as the "map-based stock quote" scenario.

Although not required, the services in the sequence may be distributed across a network. For instance, the first service 211 might be located at one network node, whereas the second service 212 may be at another network node. However, some or all of the services may be at the same network node. The services may be, for example, Web services, or may be any component or module to which a function call may be placed, either locally or remotely. The data input entity 201 and the data consuming entity 202 may be the same computing system or different computing systems, and may be located a different network nodes as compared to the services 210, or perhaps may be at the same network node as one or more of the services 210. In this description and in the claims, two computing systems are at different network nodes if they use networking protocols to communicate.

In order for the series of services to communicate, some transformation of the input data and/or output data might be useful. For example, in the above-described map-based stock quote scenario, suppose that the map service provides only names of corporations, but not ticker symbols, whereas the finance service expects stock quotes. In that case, some mapping transformation would occur in which company names are mapped to ticker symbols. Alternatively, suppose that the map service generated company names in XML format, whereas the finance service expects input as in a particular other kind of non-XML object. In that case, some format conversion may occur. Transformation may also have occurred to the data input to the map service. For instance, perhaps the data input entity generated parameters called "latitude" and "longitude", whereas the map service might expect parameters called "lat" and "long", respectively. Transformations may also occur at the output of the finance service in order to provide the resultant data in a form that may be consumed by the data output entity.

Referring to FIG. 2, for example, the first service 211 may perform one or more transformations on its input data 221 received from the data input entity 201 as represented by the input transformation component 211A, and may perform one or more transformations on its output data 222 as represented by the output transformation component 211B. Also, the second service 212 may perform transformation(s) on its input data 222 using input transformation component 212A, and may perform transformation(s) on its output data 223 using output transformation component 212B, and so on, and so forth, for other services in the sequence of services 210. Finally, the final service 213 may perform transformation(s) on its input data 224 using input transformation component 213A, and may perform transformation(s) on its output data 225 using output transformation component 213B.

Figure 3:
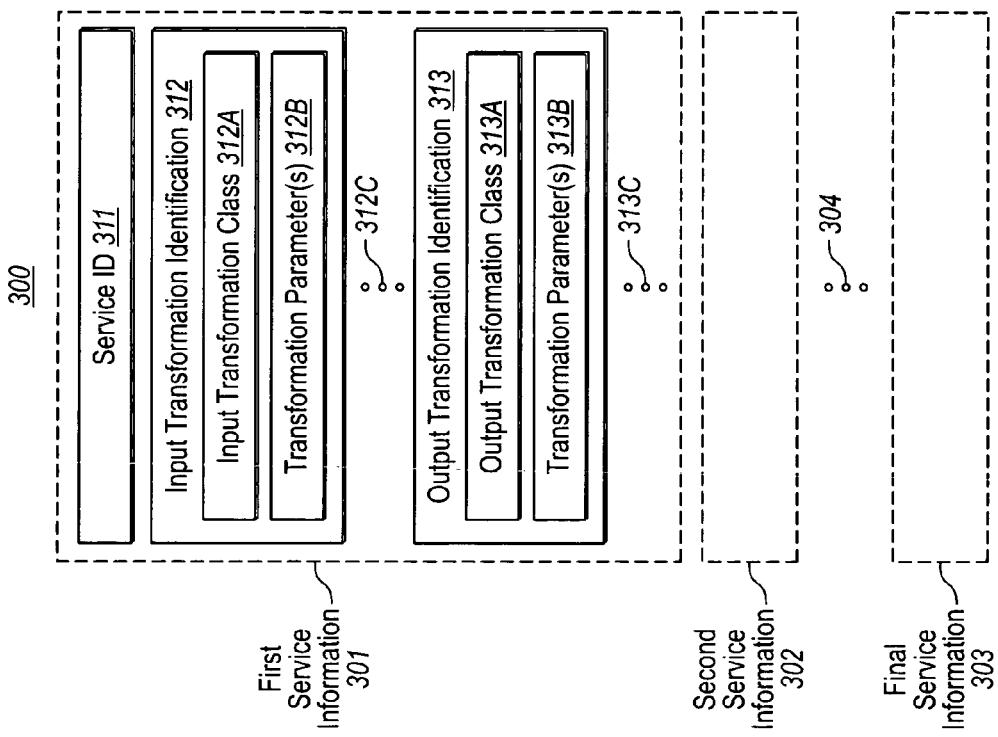
FIG. 3 schematically illustrates a data structure that includes identifications of services with corresponding class and parameters for input and output transformations from those services.

Rather than perform such transformations by drafting custom code for each transformation, embodiments of the present invention define the transforms declaratively using a data structure. FIG. 3 illustrates an example of a data structure 300. The data structure 300 includes a service identification field for each service in the service sequence. For instance, first service information 301 includes service identifier field 311 that identifies the first service (see first service 211 of FIG. 2). Likewise, the second service information 302 may identify the second service 212 of FIG. 2, and the final service information 303 may identify the final service 213 of FIG. 2. The vertical ellipses 304 represents that there may be other similar information for other services.

For each service, there may potentially be one or more input transformation identification fields 312 that include an input transformation class field 312A that identifies a class of transformation to be performed on the input data prior to being processed by the service, as well as one or more transformation parameter fields 312B that identifies one or more parameters of the class of transformation to thereby more specifically define the transformation. As represented by the vertical ellipses 312C, there may be more than one input transformation for any given service. There may also be no input transformations specified.

The combination of the transformation class and the transformation parameter(s) may be used to identify a more specific transformation. Examples of classes of transformations may include parameter mapping transformations or format conversion transformations. For instance, suppose the transformation class is a parameter mapping class. Examples of parameters might include, for instance, an identification of which parameter name (e.g., "latitude" or "longitude") is to be mapped to which parameter name (e.g., "lat" or "long", respectively).

Similarly, for each service, there may potentially be one or more output transformation identification fields 313 that include an output transformation class field 313A that identifies a class of transformation to be performed on the output data prior to being processed by the service, as well as one or more transformation parameter fields 313B that identifies one or more parameters of the class of transformation to thereby more specifically define the output transformation. As represented by the vertical ellipses 313C, there may be more than one output transformation for any given service. There may also be no output transformations specified. The combination of the transformation class and the transformation parameter(s) may be used to identify a more specific output transformation as well.

As previously mentioned, each of the fields described above with respect to the first service information 301 may be included in the second service information 302 and the final service information 303 with respect to the corresponding second service 212 and the final service 213. The layout of the fields described with respect to the data structure 300 do not imply any positional or hierarchical relationship with respect to the fields. For instance, any single illustrated field may be comprised of multiple distributed fields, and need not include just the information specified as being described in the field. Furthermore, fields shown as being included within another field need not be included within that field at all.

The data structure 300 may be specified using text. In one embodiment, eXtensible Markup Language (XML) documents may be used for the data structure, although that is by no means required. The use of intuitive text documents to declaratively specify transformations allows more complex transformations to be specified and changed without going through the time-consuming and costly exercise of manually changing the underlying code. The data structure 300 may be available to each service in the sequence of service either by registering the data structure 300 with each of the services in advance of the service request, or by providing the data structure 300 with or after the service request.

Figure 4:
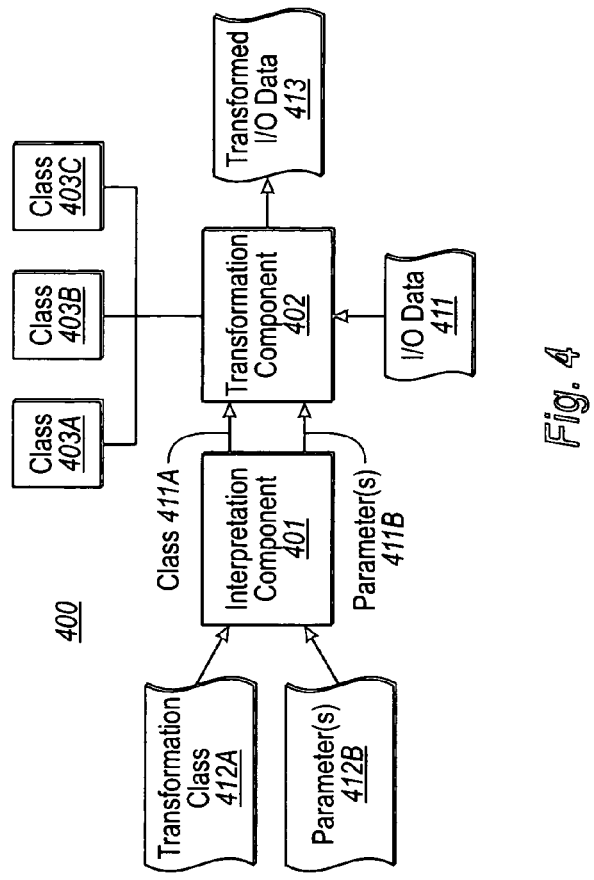
FIG. 4 schematically illustrates a logical flow associated with using the data structure to perform a transformation.

FIG. 4 illustrates a transformation architecture 400 that may be used to perform the transformation. An interpretation component 401 represents computer-executable instructions for interpreting the transformation class field and the one or more transformation parameter fields. Specifically, the interpretation component 401 receives the transformation class declaration 412A and the parameter(s) declaration 412B and provides a class identification 411A and a parameter(s) identification 411B to a transformation component 402.

The transformation component 402 represent computer-executable instructions for performing the transformation specified by the combination of the transformation class field and the one or more transformation parameter fields. The transformation component 402 has access to a number of unpopulated or not fully-populated transformation classes 403A through 403C. The transformation component 402 selects the appropriate transformation class 403A through 403C using the class identifier 411A. The transformation component 402 then instantiates a transformation object that is derived from that class, and populates the object with the parameter(s) 411B. The result is an object that may be executed to thereby receive the input or output data 411 and transform the data into transformed input or output data 413.

Figure 5:
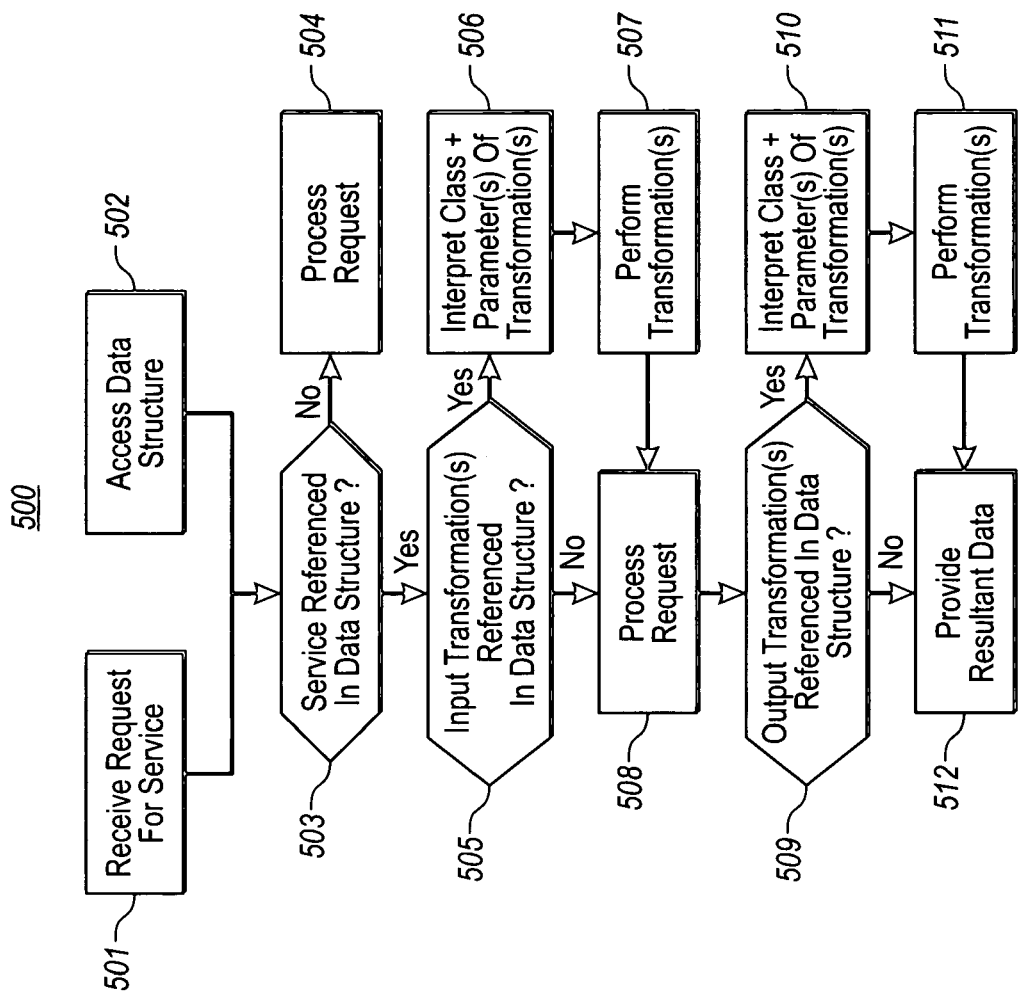
FIG. 5 illustrates a flowchart of a method for a service to process a service request in accordance with the principles of the present invention.

FIG. 5 illustrates a flowchart of a method 500 for a service to process data with appropriate input and/or output transformations in accordance with the principles of the present invention. The service receives a request for a service from either the data source entity 201 or the previous service in the service sequence 210 (act 501). This service request may be received over a network or locally from another process within the same computing system.

In addition, the service accesses the data structure (act 502) described above with respect to FIG. 3. As the service may access the data structure before, during, or after the service request is received, the data structure is shown as being accessed in parallel with the receipt of the service request. However, in specific embodiments, the data structure may be received with the service request. In one embodiment, the service only has access to the portion of the data structure that pertains to that service. For instance, the first service 211 may have access to only the first service information 301, and so forth for the other services.

The service then determines whether the service is referenced in the data structure (decision block 503). In other words, the service determines that the service request received by the service is for one of the services in the service sequence. If the service is not referenced in the data structure (No in decision block 504), then the request is processed (act 504) without relying on the data structure to specify any input and/or output transformations.

If the service is referenced in the data structure (Yes in decision block 503), then the service identifies whether there are any associated input transformations specified in the data structure (Decision block 505). If there are none (No in decision block 505), then the request is processed using the input data (act 508). On the other hand, if there are input transformations specified (Yes in decision block 505), then for each of the input transformations, the service interprets the transformation class field and the one or more transformation parameter fields (act 506) and performs the performs the input transformation specified by the combination of the transformation class field and the one or more transformation parameter fields (act 507). This may be accomplished using the transformation architecture 400 of FIG. 4. After all the specified input transformations are performed in the specified sequence, the service request is processed on the transformed input data (act 508) to generate the resultant output data.

The service then determines whether or not there are any associated output transformations to be performed on the output data (decision block 509). If there are none (No in decision block 509), the resultant data is provided to the data output entity 202 or to the next service in the service sequence 210 (act 512). On the other hand, if there are output transformations specified (Yes in decision block 509), then for each of the output transformations, the service interprets the transformation class field and the one or more transformation parameter fields (act 510) and performs the output transformation specified by the combination of the transformation class field and the one or more transformation parameter fields (act 511). Once again, this may be accomplished using the transformation architecture 400 of FIG. 4. After all the specified output transformations are performed, the resultant transformed data is provided to the data output entity 202 or to the next service in the service sequence 210.

Although methods have been described with respect to FIG. 5 and the associated figures and description, the principles of the present invention extend to computer program product comprising one or more computer-readable media having thereon one or more computer-executable instructions that, when executed by one or more processors of the server computing system, cause the computing system to perform all or portions or either or both of these methods. For instance, referring to FIG. 1, memory 104 and communication channels 108 may represent examples of such computer-readable media. The memory 104 represents an example of physical computer-readable media in the form of physical storage and/or memory media. The principles of the present invention also extend to computing systems themselves that are configured through hardware, software, or a combination of hardware and software, to perform all of portions of the methods of FIG. 5.

Having now described the broad principles of the present invention in some details, a more specific example will now be described. One skilled in the art will recognize after having reviewed this description, that there are enumerable ways to implement the broader principles of the present invention apart from this example. Accordingly, this example is illustrative only, and not limiting.

In one example, the data structure 300 may be the following XML document with line numbering added for clarity:

```
<?xml version="1.0" encoding="utf-8" ?>
<bridge namespace="Samples" className="BookSearch">
  <proxy type="Microsoft.Web.Services.BridgeRestProxy" url="http://booksearchexample.com/xml" />
  <method name="Search">
    <input>
      <parameter name="Service" value="AWSECommerceService" ServerName= "BookSearch"/>
      <parameter name="AWSAccessKeyId" value="% appsettings : AWSAccessKeyId %" serverOnly="true" />
      <parameter name="Keywords" ServerName= "SearchTerms"/>
      <parameter name="Operation" value="ItemSearch" />
      <parameter name="SearchIndex" value="Books" />
    </input>
    <transforms>
      <transform type="Microsoft.Web.Services.XPathBridgeTransformer">
        <data>
          <attribute name="selector" value="bs:Items/bs:Item" />
          <dictionary name="namespaceMapping">
            <item name="bs" value="http://webservices.amazon.com/AWSECommerceService/2005-10-05" />
          </dictionary>
          <dictionary name="selectedNodes">
            <item name="Title" value="bs:ItemAttributes/bs:Title" />
            <item name="Product" value="bs:ItemAttributes/bs:ProductGroup" />
            <item name="Author" value="bs:ItemAttributes/bs:Author" />
            <item name="ASIN" value="bs:ASIN" />
          </dictionary>
        </data>
      </transform>
    </transforms>
  </method>
  <method name="SearchRaw" outputMode="Raw">
    <input>
      <parameter name="Service" value="AWSECommerceService" />
      <parameter name="AWSAccessKeyId" value="xyz" serverOnly="true" />
      <parameter name="Keywords" />
      <parameter name="Operation" value="ItemSearch" />
      <parameter name="SearchIndex" value="Books" />
    </input>
  </method>
</bridge>
```

In this data structure, the "bridge" element defines a service called BookSearch in its attributes. The BookSearch service is an example of a service illustrated in the sequence of services in FIG. 2 The proxy type may also be specified thereby identifying a proxy to be used to communicate with the service. The proxy element also includes a URL that may be used by the proxy to connect with the first service. The bridge element defines two methods associated with the BookSearch attribute, one called Search, and one called RawSearch.

The Search method defines some input parameters to the Search method. Such parameters include Service, AWSAccessKeyId, Keywords, Operation and Search Index. The ServerName attribute is present for two of the input parameters, namely, Service and Keywords. The ServerName attribute name is an example of a transformation class identification. The value of the ServerName attribute is an example of transformation parameters. For instance, the ServerName attribute in the parameter name="Service" element indicates a parameter mapping class transformation in which the parameter named "Service" is to be mapped to a name "BookSearch". Similarly, the "Keywords" parameters is mapped to the "SearchTerms" parameter. Accordingly, the "input" element defines two parameter mapping functions.

The "transforms" element specifies an output transform named "XPathBridgeTransformer" which extracts name-value pairs from the resulting data, and places them in the form of an XML document. The XPathBridgeTransformer reference is an example of a transform class identification. In this case, the Title, ProductGroup, Author, and ASIN fields are extracted from the search results and placed into an XML document. Thus, the item name elements are examples of transformation parameters. The SearchRaw method is similar to the Search method except that no output transformation is specified.

Thus, the principles of the present invention provide a convenient mechanism for specifying transforms declaratively on both input data to a service and output data from a service. To change the transform, the underlying code need not be changed, but rather the high-level declaration would be altered.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer storage media having stored thereon a data structure, the data structure comprising a declarative model that defines transformations to data as it passes between two or more services, but does not implement the transformations, the data structure including the following:
   a plurality of service identification fields, each identifying a service in a sequence of two or more services;
   a transformation class field specifying a class of transformation to be performed on either input data prior to being provided to the sequence of services, inter-service data provided between two services of the plurality of services in the sequence of services, or output data output from the sequence of services, wherein the input data, inter-service data, and output data are separate from the data structure; and
   one or more transformation parameter fields identifying one or more parameters of the class of transformation to thereby more specifically define the transformation;
   wherein the one or more computer storage media further store a transformation component and one or more transformation classes that are identified by the transformation class field of the data structure, and wherein upon receiving the data structure, the transformation component instantiates one or more objects derived from the one or more identified transformation classes and populates the one or more objects with the one or more parameters of the one or more transformation parameter fields, wherein once instantiated, the one or more objects are executed to perform the transformation specified in the transformation class field of the data structure on either the input data, the inter-service data, or the output data.

2. One or more computer storage media in accordance with claim 1, wherein the plurality of service identification fields, the class transformation class field, and the one or more transformation parameter fields are specified using text.

3. One or more computer storage media in accordance with claim 1, wherein the transformation class field specifies a class of transformation to be performed on the input data prior to being provided to the sequence of services.

4. One or more computer storage media in accordance with claim 1, wherein the transformation class field specifies a class of transformation to be performed on the inter-service data.

5. One or more computer storage media in accordance with claim 1, wherein the transformation class field specifies a class of transformation to be performed on the output data output from the sequence of services.

6. One or more computer storage media in accordance with claim 1, wherein the transformation class field is a first transformation class field, the class of transformation is a first class transformation, the transformation is a first transformation, and the one or more transformation parameter fields are first one or more transformation parameter fields, wherein the first transformation class field specifies a class of transformation to be performed on the input data prior to being provided to the sequence of one or more services, the computer storage media further having thereon the following:
   a second transformation class field specifying a second class of transformation to be performed on the inter-service data provided between two services of the plurality of services in the sequence of services; and
   second one or more transformation parameter fields identifying one or more parameters of the second class of transformation to thereby more specifically define the second transformation.

7. One or more computer storage media in accordance with claim 6, the computer storage media further having thereon the following:
   a third transformation class field specifying a third class of transformation to be performed on the output data output from the sequence of services; and
   third one or more transformation parameter fields identifying one or more parameters of the third class of transformation to thereby more specifically define the third transformation.

8. One or more computer storage media in accordance with claim 1, wherein the transformation class field is a first transformation class field, the class of transformation is a first class transformation, the transformation is a first transformation, and the one or more transformation parameter fields are first one or more transformation parameter fields, wherein the first transformation class field specifies a class of transformation to be performed on the input data prior to being provided to the sequence of one or more services, the computer storage media further having thereon the following:
   a second transformation class field specifying a second class of transformation to be performed on the output data output from the sequence of services; and
   second one or more transformation parameter fields identifying one or more parameters of the second class of transformation to thereby more specifically define the second transformation.

9. One or more computer storage media in accordance with claim 1, wherein the transformation class field is a first transformation class field, the class of transformation is a first class transformation, the transformation is a first transformation, and the one or more transformation parameter fields are first one or more transformation parameter fields, wherein the first transformation class field specifies a class of transformation to be performed on the inter-service data provided between two services of the plurality of services in the sequence of services, the computer storage media further having thereon the following:

a second transformation class field specifying a second class of transformation to be performed on the output data output from the sequence of services; and second one or more transformation parameter fields identifying one or more parameters of the second class of transformation to thereby more specifically define the second transformation.

10. One or more computer storage media in accordance with claim 1, wherein the class of transformation comprise a parameter mapping transformation.

11. One or more computer storage media in accordance with claim 1, wherein the class of transformation comprises format conversion transformation.

12. One or more computer storage media in accordance with claim 1, wherein the at least one or more of the plurality of services is at a different network node than at least one or more of the other of the plurality of services.

13. One or more computer storage media in accordance with claim 12, wherein the plurality of services are at one or more different network nodes as compared to a component that generated the input data.

14. A method for a service to receive and process input data from another network node, the method comprising an act of receiving a request for a service and associated input data;

an act of accessing a data structure stored on a computer storage medium the data structure comprising a declarative model, the data structure being separate from the input data, the data structure including a plurality of service identification fields, each identifying a service in a sequence of two or more services, and at least one of which identifying the requested service; a transformation class field specifying a class of transformation to be performed on input data prior to being provided to the sequence of two or more services; and one or more transformation parameter fields identifying one or more parameters of the class of transformation to thereby more specifically define the transformation;

an act of determining that the service request is for one of the plurality of services;

an act of instantiating an instance of a transformation class that is identified in the transformation class field of the data structure and populating the instance with the one or more parameters; and an act of performing the transformation specified by the combination of the transformation class field and the one or more transformation parameter fields by performing the transformation on the input data by executing the instance.

15. A method in accordance with claim 14, wherein the transformation class field is a first transformation class field, the class of transformation is a first class transformation, the transformation is a first transformation, the one or more transformation parameter fields are first one or more transformation parameter fields, the data structure further including a second transformation class field specifying a class of transformation to be performed on output data prior to being provided to a next service in the sequence of service or prior to being output by the service; and one or more transformation parameter fields identifying one or more parameters of the class of transformation to thereby more specifically define the transformation, the method further comprising:

an act of processing the service request to generate the resulting data;

an act of interpreting the second transformation class field and the second one or more transformation parameter fields; and an act of performing the second transformation specified by the combination of the transformation class field and the one or more transformation parameter fields by performing the transformation on the resulting data.

16. A computer program product comprising one or more computer storage media having computer-executable instructions thereon that, when executed by one or more processors of the computing system cause the computing system to perform the method of claim 14.

17. A method for a service to process resulting data, the method comprising:

an act of processing a service request to generate the resulting data;

an act of the accessing a data structure stored on a computer storage medium, the data structure comprising a declarative model, the data structure being separate from the resulting data, the data structure including a transformation class field specifying a class of transformation to be performed on the resulting data prior to being provided to a next service in the sequence of service or prior to being output by the service; and one or more transformation parameter fields identifying one or more parameters of the class of transformation to thereby more specifically define the transformation:

an act of instantiating an instance of a transformation class that is identified in the transformation class field of the data structure and populating the instance with the one or more parameters;

an act of performing the transformation specified by the combination of the transformation class field and the one or more transformation parameter fields by performing the transformation on the resulting data by executing the instance.

18. A computer program product comprising one or more computer storage media having computer-executable instructions thereon that, when executed by one or more processors of the computing system cause the computing system to perform the method of claim 17.

\* \* \* \* \*